United States Patent [19]
Hayter

[11] 3,741,312
[45] June 26, 1973

[54] AGRICULTURAL APPARATUS HAVING BRACING MEANS FOR LATERALLY EXTENDING PIVOTAL FRAME SECTIONS

[76] Inventor: Rex G. Hayter, 430 Sunbeam Road, American Falls, Idaho 83211

[22] Filed: Aug. 6, 1970

[21] Appl. No.: 61,710

[52] U.S. Cl.............. 172/448, 172/449, 172/459, 172/470, 172/657
[51] Int. Cl............................................ A01b 59/06
[58] Field of Search.................. 172/619, 631, 630, 172/640, 634–637, 660, 448, 449, 451, 459, 397, 310–311, 470, 456, 469, 657, 677, 679, 583, 468; 280/411–413

[56] References Cited
UNITED STATES PATENTS

| | | | |
|---|---|---|---|
| 1,260,079 | 3/1918 | Sivley | 172/640 |
| 2,298,161 | 10/1942 | Robinson | 172/459 |
| 1,754,497 | 4/1930 | Boucher | 172/630 |
| 1,042,493 | 10/1912 | Smith | 172/630 |
| 3,490,542 | 1/1970 | Eiten | 172/448 |
| 3,302,956 | 2/1967 | Sosalla | 172/311 |
| 462,346 | 11/1891 | Yerby | 172/630 |
| 1,945,882 | 2/1934 | Collins | 172/619 |
| 3,463,241 | 8/1969 | Essex | 172/311 |
| 3,477,518 | 11/1969 | Walker et al. | 172/469 |
| 3,520,373 | 7/1970 | Stinemetz | 172/311 |
| 3,523,699 | 8/1970 | Sinkule et al. | 172/311 |

FOREIGN PATENTS OR APPLICATIONS

| | | | |
|---|---|---|---|
| 253,491 | 6/1964 | Australia | 172/310 |
| 1,389,159 | 12/1965 | France | 172/657 |
| 516,993 | 2/1955 | Italy | 172/446 |

*Primary Examiner*—Robert E. Pulfrey
*Assistant Examiner*—C. W. Hanor
*Attorney*—Cushman, Darby & Cushman

[57] ABSTRACT

A planting, earth-working or earth-treating apparatus is provided with a plurality of frame sections which are mounted relative to a rigid support bar for limited pivotal movement about axes which extend along lines which are generally parallel to or coincident with the intended line of travel of the apparatus. The rigid support bar is of a form and configuration to be attached to standard three-point or other coupling arrangements of tractors and other prime movers. Guiding means are carried by the rigid support bar for bracing each of the frame sections to prevent unwanted rearward movement or distortion of the frame sections during forward travel of the apparatus. At the same time, the guiding means provide for limited vertical movements of the frame sections about their respective axes so that the apparatus can conform to the shape of uneven ground over which it is traveling. Power operated means are provided for individually adjusting the frame sections, as desired.

13 Claims, 6 Drawing Figures

United States Patent
Hayter
[11] 3,741,312
[45] June 26, 1973
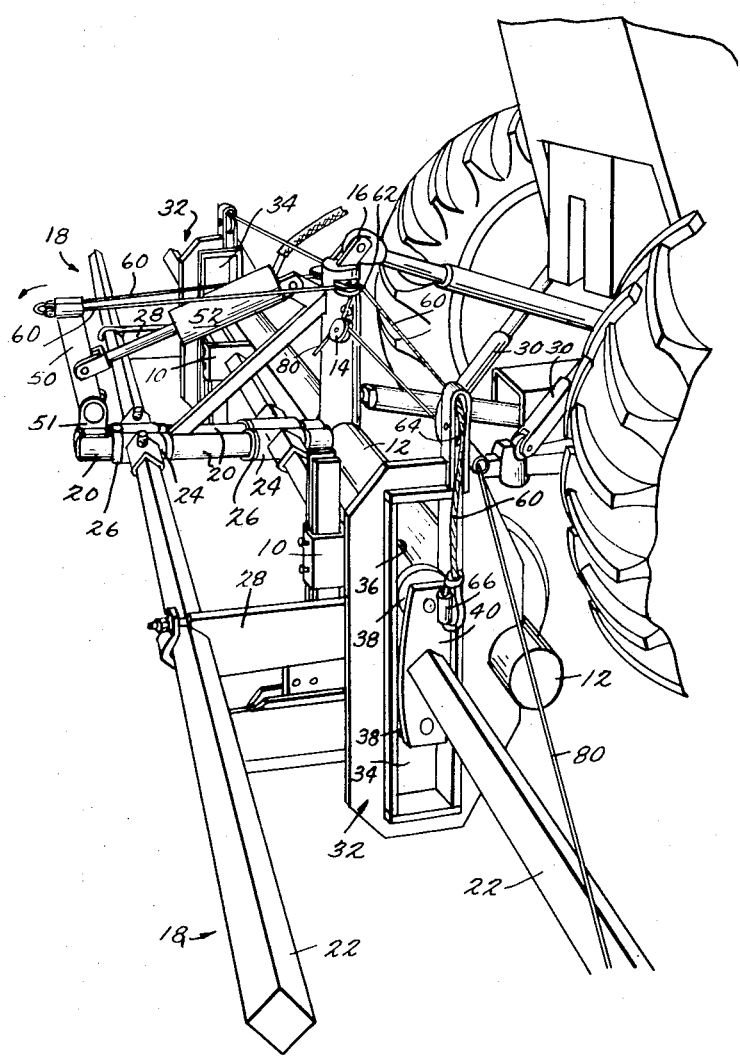

PATENTED JUN 26 1973

INVENTOR
REX G. HAYTER

BY Cushman, Darby & Cushman
ATTORNEYS

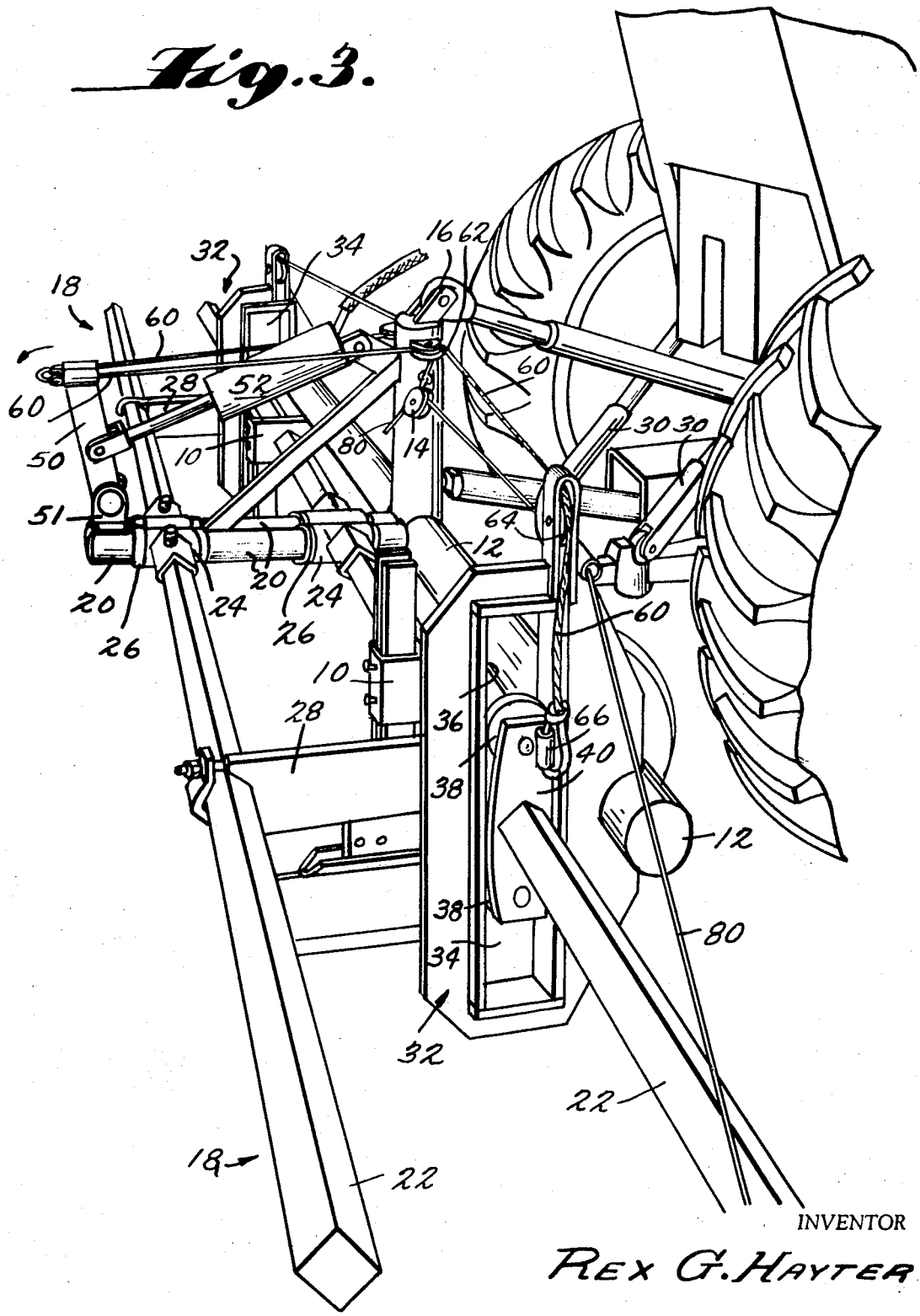

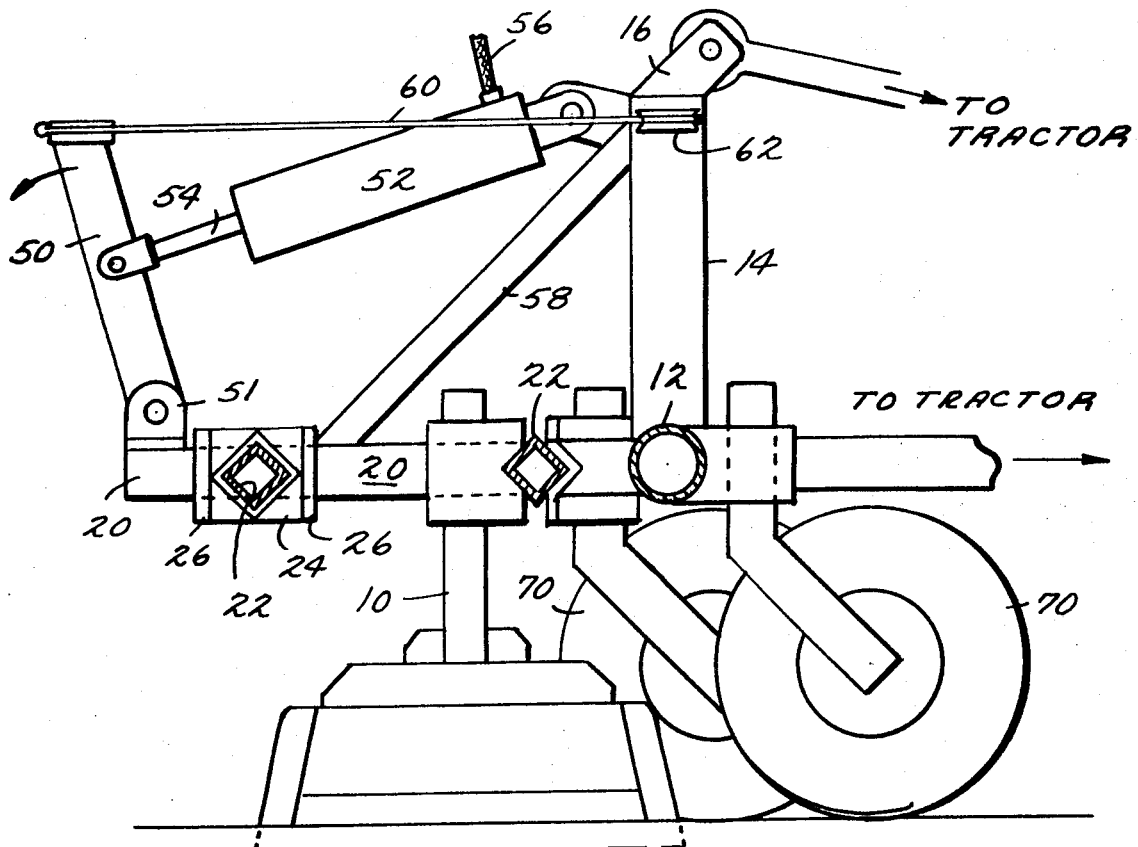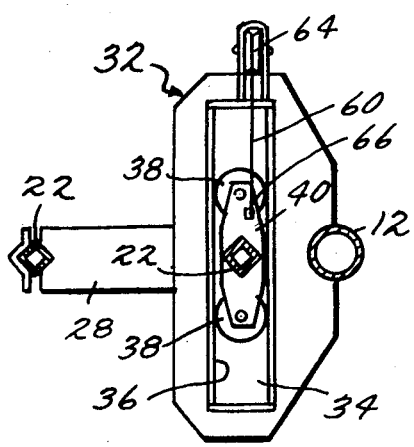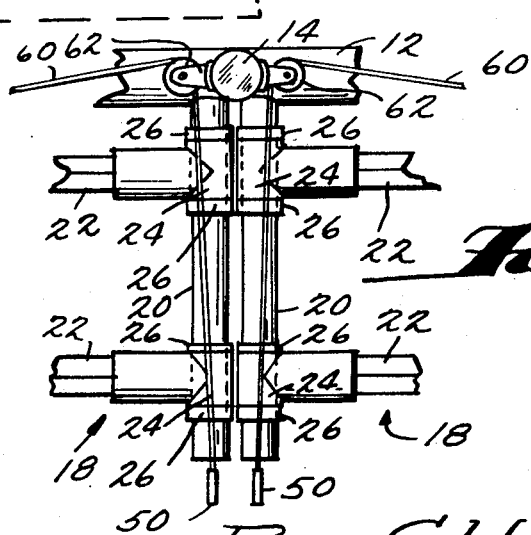

3,741,312

AGRICULTURAL APPARATUS HAVING BRACING MEANS FOR LATERALLY EXTENDING PIVOTAL FRAME SECTIONS

BACKGROUND AND BRIEF DESCRIPTION OF INVENTION

The present invention relates to an agricultural type of apparatus in the form of a frame means which can be attached to a prime mover for pulling agricultural devices over the ground. In particular, the invention is concerned with an improved frame means which includes two or more frame sections that can individually conform to the terrain over which the apparatus is traveling.

In the context of this specification, reference to the herein disclosed agricultural type of apparatus is intended to include similar earth-working or earth-treating appliances, whether used strictly for agricultural purposes or for some other purpose. The apparatus of this invention is of a type which can carry a plurality of earth-working or earth-treating devices such as planting devices, cultivators, discs, or various forms of plant treating or removing tools and appliances. For simplicity of discussion, descriptions will be limited to earth-working and earth-treating devices.

It is known in this art to provide for various structures which can support agricultural tools and devices and which can be coupled to existing prime mover equipment for movement over the earth. Such apparatus often carries a plurality of tools or other devices which move through the earth itself, for purposes of working, treating or planting, and this creates relatively severe forces on the apparatus. Thus, for many such uses, apparatus of this type is necessarily limited in the number of earth-working or treating tools that can be carried without danger of damage or breakage of the apparatus itself. It is also known in this art to provide for adjustable frame structures, or frame structures made up of a number of sections which can pivot relative to each other, where it is intended to maintain some conformity of the apparatus and the tools that it carries, with the shape of the terrain over which it travels. However, adjustable frame structures of the type just mentioned have been limited, for the most part, to relatively light duty and have not found acceptance where a great number of tools must be carried for heavy earth-working or treating purposes.

The present invention provides for an improved agricultural apparatus having a major frame means made up of two or more adjustable frame sections so that tools or other devices carried by the individual frame sections will generally conform to the shape of the terrain being worked or treated. In addition, the invention provides such a frame means with a capability of carrying a relatively large number of tools for heavy duty earth-working and treating operations without danger of damaging or breaking the frame means or any other part of the overall apparatus. Thus, the invention provides for a very novel and useful apparatus which can perform the needed task of working a plurality of rows while conforming to uneven terrain.

In accordance with the invention, two or more tool carrying frame sections are pivotally mounted to a rigid support bar means which can be connected to known coupling equipment of a tractor or other prime mover. In a preferred embodiment, a pair of such frame sections are mounted on a pair of pivot bars rigidly secured to the support bar means in side-by-side relationship at the center of the support bar means. The pivot bars are mounted in horizontal planes so that a pivot axis is defined on each side of a central longitudinal axis of the overall apparatus. With this arrangement each frame section is pivotally mounted to its respective pivot bar, and this permits limited raising and lowering of outer ends of the two frame sections so that each section will raise and lower to conform to uneven terrain.

In order to prevent damage or breakage of the adjustable frame sections, a novel guiding means is positioned outwardly away from the pivot axis of each frame section so as to brace its associated frame section from unwanted rearward movement or distortion during forward movement of the apparatus over the ground. Each guiding means is preferably in the form of a structure which provides a relatively broad bearing surface against which a portion of the frame section can be engaged to limit its rearward travel. The bearing surface may be part of a raceway defined by a vertical opening through the guiding means, and the frame section is preferably provided with bearing elements which can contact the bearing surface to allow smooth vertical adjustment of the individual frame section, while, at the same time, restraining the frame section from distortion or breakage.

In addition, the invention provides for a power operated means for lifting and lowering each frame section about its respective pivot axis so that the frame sections can be lifted to avoid obstructions during turning movements or whenever needed.

These and other advantages of the present invention will become apparent in the more detailed discussion which follows, and in that discussion reference will be made to the accompanying drawings as briefly described below.

BRIEF DESCRIPTION OF DRAWINGS

FIG. 3 is a perspective view of major components of the apparatus of this invention, with certain details omitted for clarity;

FIG. 4 is a greatly enlarged cross-sectional view as would be seen on line 4—4 of FIG. 1;

FIG. 5 is an enlarged cross-sectional view of a guiding means associated with the apparatus of the present invention as seen on line 5—5 of FIG. 2; and FIG. 6 is an enlarged view of the central portion of FIG. 1.

DETAILED DESCRIPTION OF INVENTION

Figure 1:
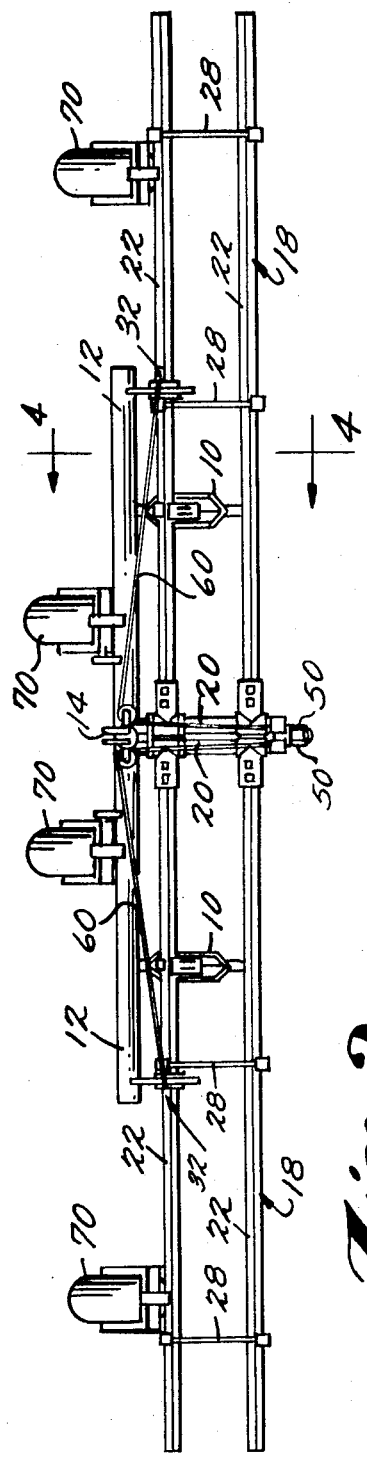
FIG. 1 is a top plan view of the apparatus of the present invention, with certain portions omitted for clarity.
Figure 2:
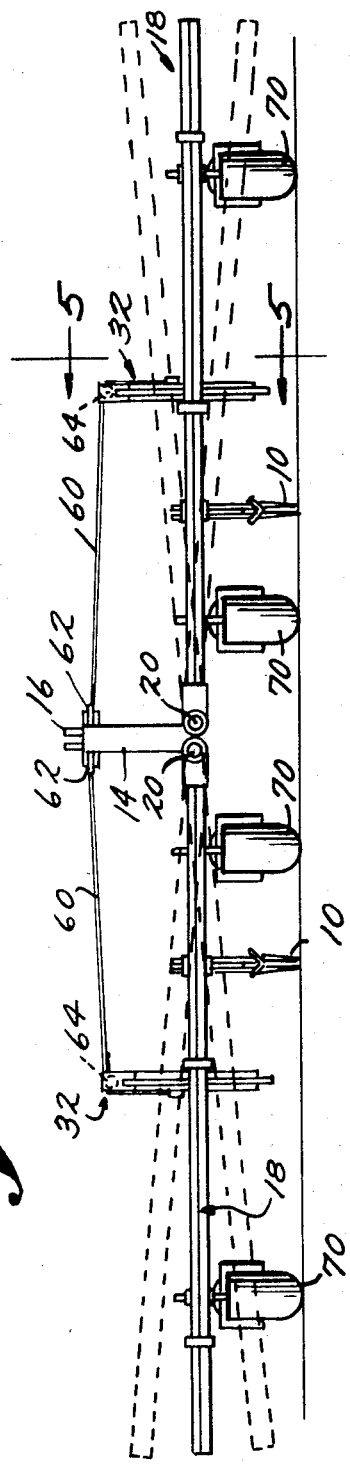
FIG. 2 is a rear end elevational view of the apparatus shown in FIG. 1.

Referring to FIGS. 1 and 2, the overall arrangement of the apparatus of this invention is illustrated in outline form. Specific details of this same apparatus will be discussed later with reference to the other drawings. The illustrated embodiment of the invention provides for an appliance which can be mounted at the rear end of a prime mover, and the following discussion will make reference to forward and rear positions in the context. However, it is to be understood that the basic concepts of the invention can be utilized with front or side mounted equipment, if desired.

The basic arrangement illustrated by the embodiment of FIGS. 1 and 2 provides for a frame means capable of supporting and carrying a number of earth-working or treating devices along its length. Two such devices 10 are illustrated, but it is to be understood that a relatively large number of tools can be positioned along the frame means. The frame means is provided with a rigid support bar means 12 at its forward end for being coupled to a standard hitching or coupling device associated with a tractor or other prime mover. The rigid support bar means 12 may include an upright post portion 14 rigidly secured thereto for positioning a coupling bracket for use in a standard three-point tractor coupling system (see FIGS. 3 and 4, for example, wherein an upper bracket 16 is carried by the upright post 14; and similar brackets are carried in spaced positions along the lower support bar means 12). The upright post 14 is rigidly secured to the horizontal support bar means 12 by welding or by any other known means. Both parts of the support bar structure may be formed from rigid stock material having a configuration other than the circular cross section which is illustrated, if desired.

A further part of the apparatus includes a pair of frame sections 18 which are separate from one another and each mounted for pivotal movement relative to the rigid support bar means 12. In the illustrated embodiment, a pair of pivot bar means 20 are rigidly secured to extend rearwardly from the support bar means 12 in a generally horizontal plane so that the two pivot bar means lie in a common plane on each side of a central longitudinal axis of the apparatus. The two frame sections 18 are mounted on the rearwardly extending pivot bar means 20 by the use of sleeve structures which slide over the pivot bar means and which are held in place by retaining rings. Details of this mounting arrangement are shown in FIG. 6 wherein each frame section 18 is shown as including a pair of spaced framing members 22 secured to sleeve members 24 which are capable of sliding on and rotating relative to the pivot bar means 20. The frame sections are held in position on the pivot bars 20 by the use of retaining rings 26 which are secured in place by bolts or other known fastening devices. Thus, it can be seen that each of the frame sections 18 can rock about a pivot axis which is horizontally disposed and which is parallel to or coincident with the longitudinal center line for the apparatus. FIG. 2 illustrates a limited range of tilting movements available to each of the frame sections 18, and this range of movements permits a conforming of each of the frame sections 18 to the terrain over which the apparatus travels. The individual frame members 22 which make up the frame sections 18 are assembled in a known fashion with spacing bars 28 secured between them to define and maintain an overall shape and size for each frame section. However, the frame sections 18 may be formed from single framing members 22, if desired, which are pivotally mounted on pivot bar means 20 in the same manner as shown for the assembled frame arrangement.

FIG. 3 illustrates a typical embodiment of the invention, as attached to a tractor through a three-point hook-up of a standard tractor hitch. One of the mounting points with the tractor is at the upper end of the upright post 14 where a bracket 16 couples with an extendible rod means from the tractor. Two other points of attachment include brackets (not shown) spaced along the rigid support bar means 12 to be fastened to two additional arms extending out at a lower level from the tractor. As is standard with such coupling equipment, a lifting and lowering mechanism 30 is provided for the two lower arms of the hitching system so that the entire apparatus can be lifted and lowered from the power system of the tractor. This lifting and lowering action carries with it the rigid support bar means 12 and all associated structures, including the two separate frame sections 18 which are pivotally attached thereto.

A special feature of the present invention is a provision for guiding means 32 associated with each of the adjustable frame sections 18. The guiding means 32 are shown very schematically in FIGS. 1 and 2 and in greater detail in FIGS. 3 and 5. Each guiding means functions to permit up and down movements of its associated frame section 18 about its respective pivot bar means 20 while preventing an unwanted displacement or distortion of the frame section as a result of load forces being applied to it. Looking at the top plan view of FIG. 1, it can be appreciated that when a great number of earth-working tools are mounted along the length of the rear frame member 22 of each frame section 18, considerable load forces will be applied to each frame section when the entire apparatus is moved forwardly by a prime mover. These load forces tend to bend or distort long frame sections in rearward directions, and breakage or other damage can occur. The two guiding means 32 prevent movements of each frame section in directions opposite to the line of travel of the apparatus, and thus, distortion or other damage and breakage are prevented.

As shown in FIGS. 3 and 5, each guiding means comprises a relatively strong housing structure through which a vertical, elongate raceway opening 34 is formed. The vertically disposed raceway opening 34 allows passage of a portion of an associated frame section 18 therethrough, and in the illustrated embodiment, one frame member 22 of a frame section 18 passes through the raceway 34. The raceway opening 34 is of a sufficient height to accommodate maximum intended vertical movements of the frame section 18 as a result of a pivoting of the frame section about its associated pivot bar means 20. Each guiding means 32 is positioned for a sufficient distance laterally away from an associated pivot axis to receive a major share of forces applied to the frame section being braced and protected by the guiding means. Each guiding means 32 is rigidly secured to the rigid support bar means 12 so that there is no movement of the guiding means relative to the rigid support bar means. With this arrangement, individual frame sections 18 are free to rock up and down about their respective pivot axes, and they are guided and protected in such movements by the guiding means 32. Each guiding means further includes a bearing surface 34 for receiving load forces from its associated frame section 18. In the illustrated arrangement, a relatively broad plate is welded into the raceway opening 34 on the rear side of the opening so as to receive load forces from roller bearing elements 38 carried by the frame member 22 passing therethrough. The roller bearing element 38 may be in the form of wheels mounted between a pair of upright plate members 40 for embracing a frame member 22 to which the plate members 40 and the associated wheels are secured. Thus, as the frame section 18 is adjusted up and down to conform to uneven terrain, there is a rolling contact between the bearing members 38 and the flat bearing surface 36. If desired, the bearing surface 36 can be provided with a slot or track for receiving or supporting flanged wheels 38 in a modified version of the illustrated apparatus. Further, it is to be understood that in certain applications a bearing shoe can be substituted for the roller elements which are shown, and there will be a sliding engagement of the shoe with the bearing surface 36. Whatever the arrangement, it can be seen that a relatively broad and strong backing surface is provided for preventing rearward displacement or distortion of the frame section 18 at the point where the guiding means 32 is positioned. Additional guiding means for each frame section 18 may be provided, if needed.

In addition to the above described arrangements for providing pivotal movements of individual frame sections and for bracing such sections against unwanted distortion or movement, the invention also provides for a power operated means for lifting the individual framing sections. FIG. 3 illustrates one such power operated means in place, and such a single means may function to simultaneously lift both of a pair of frame sections of the type shown in FIG. 3, if desired. However, it is preferred that an identical power means be provided for each frame section making up the apparatus so that each frame section can be selectively controlled to pivot to a desired position about its pivot axis. FIG. 4 illustrates the basic arrangement for each power operated means for controlling a frame section 18, and it is to be understood that an identical arrangement can be provided immediately adjacent to the one which is illustrated for controlling the adjacent frame section 18. Basically, the power operated means includes a lever arm 50 which is pivotally mounted at its lower end to a bracket 51 carried on a trailing portion of the apparatus. Preferably, the bracket 51 is mounted on an associated pivot bar means 20 or on some other structure which does not tilt with movements of the frame section 18 about its pivot axis. An intermediate portion of the lever arm 50 is connected to a fluid-operated piston and cylinder combination 52. The piston and cylinder combination may be of any known construction, and may be in the form of a single-acting hydraulic cylinder which receives hydraulic fluid at one end to cause its piston to move in a direction to extend a rod portion 54 outwardly from the cylinder. A hose connection 56 is illustrated for this purpose, and the hose 56 can be connected to existing hydraulic systems of the prime mover, with known control devices including therewith. An opposite end of the piston and cylinder combination 52 is secured to the upright post 14 and to a cross brace 58 so that a strong mounting of the piston and cylinder combination is provided. Extension of the rod 54 from the cylinder causes the lever 50 to move in the direction of the arrow about its lower pivotal mounting point. A lifting cable 60 is secured at its one end to the upper end of the lever arm 50. From there the cable passes around a pulley means 62 carried at the upper end of the upright post 14; and from there, the cable continues laterally towards an outer end of the frame section 18 which it is to control. Referring back to FIG. 3, a typical arrangement provides for an ultimate connection of the cable 60 to a portion of an upright plate 40 which moves up and down in the guiding means 32 to guide the frame section 18. As shown, it is necessary to extend the lifting cable 60 over a second pulley means 64 carried at the top of the guiding means 32 before securing the end of the cable to a mounting tube 66 on the plate 40. The enlarged top plan portion shown in FIG. 6 illustrates an attachment of two lifting cables 60 to two separate lever arms 50, as would be the case where separate piston and cylinder combinations are provided for each of the separate frame sections 18. However, FIG. 6 omits any illustration of the piston and cylinder combinations because they would obscure the details which are shown.

In operation, the power operated means can function to move the lever arm means 50 rearwardly so as to lift an associated frame section 18. When it is desired to lower the frame section, hydraulic fluid is released from the cylinder and the weight of the frame section 18 will cause it to descend to a new position. Thus, a single frame section can be lifted out of the way when rock piles or fence rows are approached, and then, the lifted section can be returned back to a working position after the obstruction is passed. During normal operation, the two frame sections rock about their respective pivot axes and conform to the surface shape of the terrain being worked or treated.

As previously mentioned, a single power operated means, as shown in FIG. 3, can function to lift both cables 60 simultaneously provided both cables are secured to a common lever arm means 50. Such an arrangement might be used where positive control of each frame section 18 is not essential.

The apparatus of this invention may be provided with other structures and features known to this art. For example, wheels 70 may be mounted at a forward end of the apparatus to improve tracking and for maintaining a desired depth of operation for whatever earth-working tools are carried by the separate frame sections 18. Earth-working and treating devices may be positioned at any desired locations on any of the frame members 22 making up the adjustable frame sections 18. In addition, outrigger sections may be pivotally mounted to the ends of the individual frame sections 18, and separate cables (see the cable portion 80 shown in FIG. 3 for example) may be coupled to known mechanism for lifting and lowering the outrigger sections. More than two frame sections may be pivotally connected to a rigid support bar. Double-acting hydraulic rams may be used to lift and lower frame sections about their respective pivots, if desired.

Although the present invention has been described and illustrated in connection with one embodiment thereof, it is to be understood that modifications and variations may be resorted to without departing from the basic concepts of the invention. All such modifications and variations as will be readily understood by those skilled in this art are intended to be included within the scope of the invention claimed herein.

What is claimed is:

1. An agricultural type of apparatus in the form of a frame means which can support or carry a number of earth-working or treating devices and which can be secured to a prime mover means for movement over the ground, the combination comprising:
a rigid support bar means which can be connected to a tractor or other prime mover for securing said apparatus thereto,
a pair of pivot bar means mounted in horizontal planes on each side of a central longitudinal axis of said apparatus for supporting frame sections which extend generally transversely outwardly therefrom, said pivot bar means being rigidly secured to said rigid support bar means so that the complete apparatus can be lifted and lowered by a lifting mechanism of said tractor or prime mover, a frame section pivotally connected to each of said pivot bar means in which a way that each frame section can pivot about the axis of its pivot bar means so as to conform to the surface of the ground over which the apparatus is moving, said frame sections further functioning to carry a plurality of earth-working or treating devices, and a pair of guiding means secured to said rigid support bar means so that each guiding means contacts a portion of one of said frame sections, each guiding means being mounted so as to permit up and down movements of a frame section about its respective pivot bar means while preventing a displacement of said frame section in a direction opposite to the direction of movement of said apparatus over the ground, each guiding means being in the form of a vertically disposed raceway defined by a housing having an opening therethrough for passage of a portion of a frame section, said opening being elongate in shape and vertically disposed to permit limited up and down movement of said frame section relative thereto, and including bearing means mounted on said frame section portion for rolling engagement with said guiding means during vertical movements of said frame section relative to the guiding means.

2. The apparatus of claim 1 and including power operated means for separately controlling the positions of said frame sections about their respective pivot axes.

3. The apparatus of claim 2 wherein said power operated means includes a lever arm means associated with each of said pivot bar means for controlling movement of a cable means extending between each lever arm means and an outer portion of a frame section associated therewith, and power means for moving each of said lever arm means to lift and lower an associated frame section.

4. The apparatus of claim 3 wherein each said lever arm means extends upwardly from its associated pivot bar means and is pivotally connected at its lower end to the pivot bar means, and wherein each said cable means extends from an upper end of its associated lever arm means to a pulley means positioned above its point of connection to the outer portion of a frame section, and said pulley means being positioned above the highest vertical position of movement available to the frame section at that point.

5. The apparatus of claim 4 wherein each guiding means is in the form of a vertically disposed raceway defined by a housing structure having an elongate opening formed therethrough for receiving a portion of an associated frame section.

6. The apparatus of claim 5 wherein said pulley means is mounted on an upper portion of said guiding means.

7. The apparatus of claim 5 wherein said frame sections are provided with bearing elements at their points of passage through said guiding means so that there is a rolling engagement of said frame sections with their associated guiding means during vertical movements of the frame sections about their pivot axes.

8. The apparatus of claim 3 wherein power means for each lever arm includes a fluid operated piston and cylinder combination which can be controlled from said tractor or prime mover.

9. An agricultural type of apparatus in the form of a frame means which can support or carry a number of earth-working or treating devices and which can be secured to a prime mover means for movement over the ground, the combination comprising:

a rigid support bar means which can be connected to a tractor or other prime mover for securing said apparatus thereto, a plurality of frame sections mounted to said rigid support bar means for limited pivotal movements about pivot axes which extend in horizontal planes along lines generally parallel to or coincident with the intended line of travel for said apparatus, said frame sections having a plurality of earth-working or treating devices attached thereto, guiding means carried by said support bar means for bracing each of said frame sections to prevent unwanted rearward movement or distortion of said frame sections during forward movement of the apparatus over the ground, said guiding means including vertically disposed bearing surfaces for receiving rearwardly directed forces created on said frame sections as the apparatus is moved forwardly over the earth with said plurality of earth-working or treating devices engaging the earth, roller or wheel means carried by said frame sections for making rolling contact with said bearing surfaces of said guiding means, and means for selectively lifting said frame sections about their respective pivot axes.

10. An agricultural type of apparatus in the form of a frame means which can support or carry a number of earth-working or treating devices and which can be secured to a prime mover means for movement over the ground, the combination comprising:

a rigid support bar means which can be connected to a tractor or other prime mover for securing said apparatus thereto, a plurality of frame sections each mounted to said rigid support bar means for limited pivotal movements about a pivot axis which extends in a horizontal plane along a line generally parallel to the longitudinal center line of said apparatus, said frame sections having a plurality of earth-working or treating devices attached thereto, guiding means carried by said support bar means for bracing each of said frame sections to prevent unwanted rearward movement or distortion of said frame sections during forward movement of the apparatus over the ground, each guiding means being in the form of a vertically disposed raceway which includes a vertically disposed bearing surface for receiving rearwardly directed forces created on the respective frame section as the apparatus is moved forwardly over the earth with a plurality of earth-working or treating devices engaging the earth, said raceway being defined by a housing having an opening therethrough for passage of a portion of a frame section, said opening being elongate in shape and vertically disposed to permit limited up and down movement of said frame section relative thereto, and including roller or wheel means carried by said portion of the frame section for making rolling contact with and bearing against said bearing surface during vertical movements of the frame section relative to the guiding means, to thereby reduce friction between the guiding means and the frame sections, means for attaching said apparatus to a lifting and lowering mechanism of a prime mover so that the complete apparatus can be selectively lifted or lowered relative to the prime mover, and power operated means operatively connected to said frame sections for selectively lifting said frame sections about their respective pivot axes.

11. Apparatus as in claim 10 wherein each said pivot axis is generally coincident with the longitudinal center line of said apparatus.

12. The apparatus of claim 10 and including ground engaging wheel means on each of said frame sections.

13. The apparatus of claim 10 wherein said roller or wheel means are contained and guided within a vertical raceway formed as a transverse opening through each of said guiding means.

* * * * *